United States Patent
Schmidt et al.

(10) Patent No.: US 11,778,447 B2
(45) Date of Patent: *Oct. 3, 2023

(54) BROADCASTING PUBLIC WARNING MESSAGES OVER N3GPP ACCESS NODE OF A NON-3GPP NETWORK

(71) Applicant: IPCOM GMBH & CO. KG, Pullach (DE)

(72) Inventors: Andreas Schmidt, Braunschweig (DE); Martin Hans, Bad Salzdetfurth (DE); Achim Luft, Braunschweig (DE); Maik Bienas, Schoeppenstedt (DE)

(73) Assignee: IPCOM GMBH & CO. KG, Pullach (DE)

( * ) Notice: Subject to any disclaimer, the term of this patent is extended or adjusted under 35 U.S.C. 154(b) by 9 days.

This patent is subject to a terminal disclaimer.

(21) Appl. No.: 17/538,181

(22) Filed: Nov. 30, 2021

(65) Prior Publication Data

US 2022/0095088 A1     Mar. 24, 2022

Related U.S. Application Data

(63) Continuation of application No. 17/049,260, filed as application No. PCT/EP2019/071295 on Aug. 8, 2019, now Pat. No. 11,223,940.

(30) Foreign Application Priority Data

Aug. 10, 2018    (EP) ................................. 18188487

(51) Int. Cl.
| | |
|---|---|
| *H04W 4/90* | (2018.01) |
| *H04W 76/12* | (2018.01) |
| *H04W 4/029* | (2018.01) |
| *H04L 9/40* | (2022.01) |
| *H04W 4/08* | (2009.01) |
| *H04W 8/02* | (2009.01) |

(Continued)

(52) U.S. Cl.
CPC ............. *H04W 4/90* (2018.02); *H04L 63/164* (2013.01); *H04W 4/029* (2018.02); *H04W 4/08* (2013.01);
(Continued)

(58) Field of Classification Search
CPC ....... H04W 4/90; H04W 76/12; H04W 4/029; H04W 4/08; H04W 8/02; H04W 8/18;
(Continued)

(56) References Cited

U.S. PATENT DOCUMENTS 8,472,355 B2 *   6/2013   Zhu ............................... 370/270
9,226,125 B2 *   12/2015   Ballantyne et al. .... H04W 4/22
(Continued)

FOREIGN PATENT DOCUMENTS

EP          1798898 A1     6/2007

OTHER PUBLICATIONS

Emergency Alert System; WO 2016137596 A1; Davis et al. (Year: 2016).*

(Continued)

*Primary Examiner* — Meless N Zewdu
(74) *Attorney, Agent, or Firm* — MARSHALL, GERSTEIN & BORUN LLP; Michael P. Furmanek (57) ABSTRACT

A method of enabling a provision of public warning system, PWS, messages to a user equipment, UE, device via a non-3GPP radio network including establishing an internet protocol security, IPSec, tunnel connection from the UE device to a non-3GPP interworking function, N3IWF, via a non-3GPP, N3GPP, radio access technology, requesting from a first core network, CN, entity a provision of public warning system, PWS, messages; and providing the first CN entity with information about a location of the UE device.

10 Claims, 5 Drawing Sheets

(51) Int. Cl.
*H04W 8/18* (2009.01)
*H04W 60/00* (2009.01)
*H04W 84/04* (2009.01)
*H04W 84/12* (2009.01)

(52) U.S. Cl.
CPC ............... *H04W 8/02* (2013.01); *H04W 8/18* (2013.01); *H04W 60/00* (2013.01); *H04W 76/12* (2018.02); *H04W 84/042* (2013.01); *H04W 84/12* (2013.01)

(58) Field of Classification Search
CPC ... H04W 60/00; H04W 84/042; H04W 84/12; H04W 4/021; H04W 76/50; H04W 4/50; H04W 4/60; H04W 4/70; H04W 4/80; H04W 4/06; H04W 48/10; H04W 76/40; H04W 4/02; H04W 88/00; H04W 88/02; H04W 88/08; H04W 84/18; H04W 4/23; H04W 12/76; H04W 4/025; H04W 4/023; H04W 12/63; H04W 12/64; H04W 88/023; H04W 88/18; H04W 88/184; H04W 80/00; H04W 80/04; H04W 80/06; H04W 80/12; H04W 63/164; H04L 29/06; H04L 63/164; H04L 63/16; H04L 63/206; H04L 63/308; H04L 12/1895
See application file for complete search history.

(56) References Cited

U.S. PATENT DOCUMENTS

| | | | | |
|---|---|---|---|---|
| 9,924,043 | B2* | 3/2018 | Mehta et al. | H04M 11/04 |
| 9,936,366 | B2* | 4/2018 | Vasic | H04W 4/22 |
| 9,942,739 | B2* | 4/2018 | Bozik et al. | H04W 4/22 |
| 2011/0189971 | A1 | 8/2011 | Faccin et al. | |
| 2014/0134970 | A1* | 5/2014 | Pazos et al. | H04W 4/22 |
| 2014/0148116 | A1* | 5/2014 | Alman et al. | H04W 4/22 |
| 2015/0195696 | A1* | 7/2015 | Shukla et al. | H04W 4/22 |
| 2015/0229766 | A1* | 8/2015 | Herron, Jr. et al. | H04M 3/5116 |
| 2015/0270975 | A1* | 9/2015 | Buckley et al. | H04L 9/3247 |
| 2016/0127439 | A1* | 5/2016 | Ginnela et al. | H04L 65/601 |
| 2016/0157056 | A1 | 6/2016 | Kim et al. | |
| 2017/0005914 | A1* | 1/2017 | Edge et al. | H04L 45/26 |
| 2017/0238129 | A1* | 8/2017 | Maier et al. | H04W 4/02 |
| 2017/0289883 | A1 | 10/2017 | Kiss et al. | |
| 2018/0075720 | A1* | 3/2018 | Davis et al. | G08B 13/19669 |
| 2018/0077282 | A1* | 3/2018 | Herron et al. | H04M 3/5116 |
| 2018/0167796 | A1* | 6/2018 | Raje et al. | H04W 4/02 |
| 2018/0220269 | A1 | 8/2018 | Katakam et al. | |
| 2019/0059015 | A1 | 2/2019 | Lee et al. | |
| 2020/0344576 | A1 | 10/2020 | Li et al. | |
| 2021/0084529 | A1 | 3/2021 | Chiba et al. | |
| 2021/0176817 | A1 | 6/2021 | Takakura et al. | |

OTHER PUBLICATIONS

A Communication Method And Device; CN 109600721 A; Ge et al. (Year: 2019).*

Method and System for Managing Mbms Service Area; WO 2019104960 A1; Wang et al. (Year: 2019).*

International Search Report and Written Opinion for International Application No. PCT/EP2019/071295, dated Oct. 15, 2019.

* cited by examiner

BROADCASTING PUBLIC WARNING MESSAGES OVER N3GPP ACCESS NODE OF A NON-3GPP NETWORK

CROSS-REFERENCE TO RELATED APPLICATION

This is a continuation of U.S. patent application Ser. No. 17/049,260, filed Oct. 20, 2020, which is the United States national phase of International Patent Application No. PCT/EP2019/071295, filed Aug. 8, 2019, which claims priority to EP 18188487.5, filed Aug. 10, 2018, the entire contents of each of which being hereby incorporated by reference herein.

FIELD OF THE DISCLOSURE

The present invention relates to a mechanism for distributing public warning messages when a user equipment device is attached to a non-3GPP network.

BACKGROUND

A user equipment (UE) device in general accesses the 3GPP core network (CN) through an access network that may be a radio access network (RAN). If the radio access network is defined by 3GPP, e.g. the newly defined 5G radio access network, the access network provides a connection to an authentication and mobility function (AMF). The AMF may be present multiple times in a single CN. An AMF is usually selected for a UE at registration of a UE in the network and only one AMF is responsible for a single UE. The AMF, as all elements of the CN, can communicate to other CN elements through a routing infrastructure. The AMF for example connects to the universal data management (UDM) to authenticate a UE at registration, to receive information about subscribed services and to get security credentials used for communication with the UE.

A UE, when entering a cellular mobile network, selects a cell, e.g. the strongest cell, and acquires information about the cell and the accessible CNs from system information broadcast. If the selected cell is the most suitable, the UE sets up a connection to the respective base station and connects from there to a selected AMF to request registration at the CN. The cells of a CN are grouped in tracking areas (TAs) and the UE device requests registration in the TA of the selected cell. While registered, the CN always knows the TA or at least a configured list of TAs in which the UE resides so that the CN can connect to the UE. If the UE is in connected mode, the CN can use the established connection between UE and AMF to connect, i.e. the AMF knows the serving RAN node (base station, eNodeB, eNB). If the UE is in idle mode, the CN can request the RAN to page the UE in all cells belonging to the TA or list of TAs in which the UE is currently registered. If the UE in idle mode changes to a cell with a TA not in the list of configured TAs, the UE requests re-registration to inform the CN about the new TA and request a new list of registered TAs.

If at any time the system information of a cell changes, the cell broadcasts a paging message to inform all UEs currently residing in the cell about the change. The UE can then re-read the parts of the system information that has changed. This mechanism releases the UEs from the necessity to permanently monitor the system information to ensure the information used in the UE is up to date. Thus, UEs in idle mode can read the system information of a cell once when the cell is entered. After that, the UE listens to paging messages informing about system information change or attempts of the CN to setup a connection to the UE, e.g. in case of a pending mobile terminated call or pending downlink data.

After authentication between UE and AMF for which AMF communicates with the UDM, the UE is registered, and it can request services. If data delivery to a data network (DN) should take place, e.g. to the internet, the UE requests setup of an appropriate connection, a so-called PDU session, from the (R)AN to one or more User Plane functions (UPF) and from there to the data network. The appropriate context setup in the UPFs as well as the allocation of network resources is done by a Session Management Function (SMF). The SMF is selected by the AMF according to the subscriber data, the data network to be contacted and current network load. A network exposure function (NEF) is responsible for exchange of data between the operator network (PLMN) and entities outside that network. The NEF for example can provide subscriber or device specific information (reachability, available QoS, addresses) to servers outside the PLMN or it can provide information from outside servers to CN entities.

Cellular mobile networks in general consist of access networks and a core network as described above. The access networks provide mainly cellular radio access to mobile device, e.g. via GSM, UMTS or LTE. Additional access networks may provide access via short range radio access, e.g. WLAN, or fixed or satellite access to mobile or fixed devices. The access networks usually provide the complete functionality to setup, control and maintain radio connections to devices.

The core network provides mechanisms that are not access specific, e.g. authentication, authorization and accounting (AAA) of devices and/or subscribers, mobility between access networks and routing between the access networks and external data networks.

3GPP defines various access networks to access the 3GPP core network, e.g. GSM, UMTS, HSPA, LTE, LTE-A and in near future a 5G access network. These networks are developed to work specifically under control of the 3GPP core network. The respective base stations support the security mechanisms of the core network and they are setup and maintained by the operator of the core network or a trusted third party. As a result, the 3GPP access network can be trusted by the core network.

In addition, the 3GPP core network is setup to support access networks that may not be setup and maintained by any trusted operator, they may also reside outside the operator's domain. These access technologies are collectively named Non-3GPP access (N3GPP) and they may be so called untrusted N3GPP access if there is no trust relationship between the core network and the access network.

Figure 1:
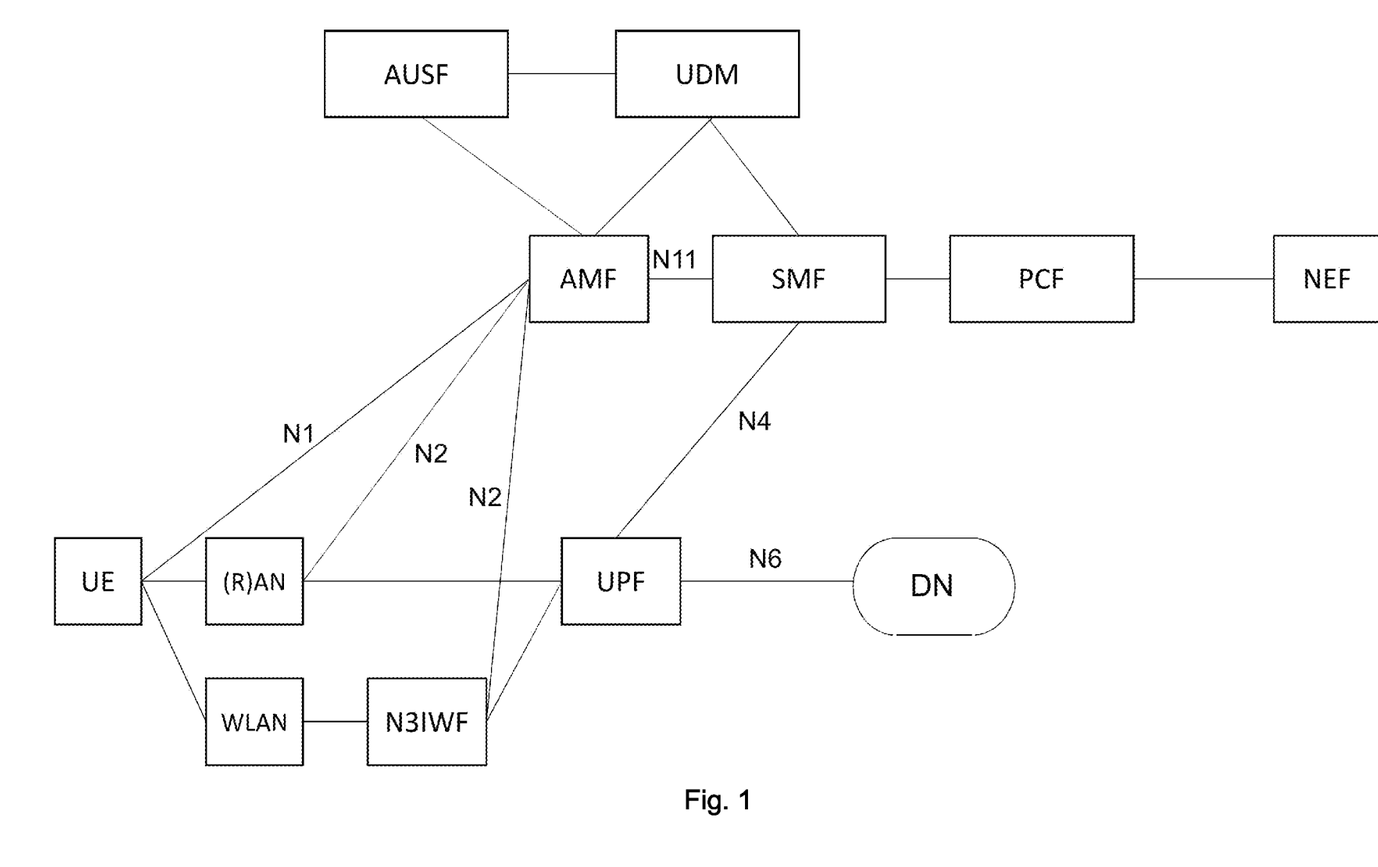
FIG. 1 is a schematic illustration of a simplified 5G core network.

FIG. 1 shows network elements that provide the UE with access to a CN via 3GPP access technologies ((R)AN) and in addition the UE connected to the CN via a non-3GPP access (N3GPP access, e.g. WLAN). The WLAN is an untrusted node, therefore the WLAN itself connects to a non-3GPP interworking function (N3IWF) that may accumulate multiple untrusted non-3GPP access networks (only one is shown in FIG. 1). The N3IWF is a device that is maintained by the operator and is therefore trusted.

The non-3GPP access to a 5G core network requires the following functionality to be performed to access the core network from a UE via untrusted N3GPP access, e.g. WLAN:

The UE acquires IP-connectivity from the WLAN access point and performs a selection of an N3IWF.

After that the UE establishes a security association with the selected N3IWF using pre-shared secrets from the UICC of the UE. The N3IWF selects an appropriate AMF, asks to authenticate the UE or its respective subscriber and receives security credentials. These credentials are the counterpart of those generated by the UICC and build the base for the security association with the UE. The UE and N3IWF setup an internet protocol security (IPsec) tunnel so that the UE can securely communicate with the N3IWF over the untrusted WLAN.

For setup of the IPsec tunnel, the N3IWF allocated to the UE a second IP address from a N3IWF-local address space, the inner IP-address. Also, the UE is provided with a destination IP address from the same address space to which the UE addresses control messages to the CN, i.e. to its AMF, the so called NAS_IP_ADDRESS. The N3IWF uses the NAS_IP_ADDRESS as source and the inner IP-address of the UE as destination for NAS signaling over the IPSec tunnel.

Once the IPsec tunnel between UE and N3IWF and the interface between N3IWF and the AMF are securely setup, the UE has a route that constitutes its logical connection to the AMF.

The UE may now request to setup connections to a data network (DN) via user plane functions (UPFs) over the untrusted WLAN. For that purpose, PDU sessions are setup via WLAN and N3IWFs and for the first and all subsequent such PDU sessions the UE is provided with a second destination IP address from a N3IWF-local address space that the UE uses to address user data.

UE devices can use any N3GPP access that provides connectivity to the N3IWF of an accessible operator network (PLMN) to connect to the network. Typical examples are private or public WLAN hot-spots providing public internet access. The UE can access the internet and via internet the N3IWF and can thus setup a secure connection to the CN.

One result of the flexibility of N3GPP access is that the CN is not aware of the location of the UE or the N3GPP access node, e.g. the WLAN access point. A UE accessing the CN may be at its home location connected to the user's private WLAN access point or at a hotel hot spot in another country. The UE device may in parallel be connected to a CN via 3GPP access, i.e. the CN of the same PLMN as with the N3GPP or of a different PLMN.

As wireless, e.g. WLAN, access points are not under control of the PLMN operator, they do not have a fixed location and they do not provide a tracking area (TA) or cell ID information to a connected UE device pointing at a location. Therefore, a 5G CN allocates a single TA to all N3GPP access networks. This TA allows distinction from 3GPP networks, but it does not provide any meaningful device location information.

While there are means to derive a device's location from its globally routable IP address, these means are neither trustworthy nor accurate. They usually lead to the location of the internet access point of the internet service provider (ISP) instead of the device's location due to network address translation performed in the ISP network.

3GPP specified a feature for public warning systems (PWS) providing the framework for several regional warning systems. PWS includes support of Japan's earthquake and tsunami warning system (ETWS), the United States' commercial mobile alert system (CMAS) and Europe's EU-alert. A warning notification provider outside the operator CN provides a warning message and a notification area to the CN. The message is currently limited in size (90 or 316 characters) and it typically comprises the event description, alert category, area affected, recommended action, expiration time and sending agency.

From the notification area a list of TAs and/or cells (cell IDs) is derived in which the warning messages need to be distributed. The transport of the messages uses broadcast mechanisms of the respective cell. In 2G and 3G system the cell broadcast feature is used for transport, in LTE systems a specific similar distribution mechanism is used based on an unacknowledged broadcast to all UEs capable of receiving the respective broadcast messages.

In LTE alert messages are transported in system information broadcasted in every cell. UEs are informed about new alert messages via paging messages similar to the system information change notification described earlier in this document. UEs camping on a cell listen to paging for CN requests to connect to the network, for system information change notifications and for alert messages according to their individual paging cycle. Roaming users and UEs must be supported by operators for PWS.

An alert category is specified globally to ensure a unique and defined mobile device behaviour. Users may be able to opt out of an alert category manually depending on device implementation and local regulation. For example, the CMAS "presidential alert" is not selectable while CMAS "extreme alerts with severity of extreme, urgency of Immediate, and certainty of observed" is selectable. Alerts received by a UE device have to be brought to the user's attention immediately, i.e. shown on the display, while they must not break ongoing audio or video conversations.

There are known warning message provisioning systems based on servers and over the top applications running on a mobile device. Warning messages are received from warning notification providers and delivered from the server on a dedicated, i.e. server to each device, IP-connection to every device that registered with one or more areas of interest comprising the notification area. These applications usually use push notification mechanisms of the mobile device's ecosystem to alert the device. The application may inform the user according to the device's current state and according to the application settings and the state of the device's MMI.

US 2014/0273909 describes a method that prevents a UE device from switching from a network supporting delivery of public warning system (PWS) alert messages, e.g. a cellular mobile network, to a networking not supporting PWS message delivery, e.g. a N3GPP network, for a predefined time after a PWS message has been received. The method allows reception of further PWS alert messages expected to follow the first message by not switching to the N3GPP network or alternatively communicating with the N3GPP network while keeping a connection to the cellular network to receive PWS messages.

The described methods solve some deficiencies of prior-art by preventing a network connection to a N3GPP while the present invention enables N3GPP networks to support the required service.

EP 1 798 898 A1 describes a method of selecting a radio access point from a plurality of access points which may support different radio technologies such as WLAN and UMTS. A control entity on the network side can decide which of the plurality of access points should be used for transmissions to a UE.

The public warning system (PWS) of 3GPP allows secure warning of users of supporting devices in a PLMN, even devices that do not have an active registration to or a subscription with the PLMN. However, PWS messages do not work via N3GPP access technologies. Neither the broadcast mechanisms to efficiently deliver warning messages nor the location mechanisms to provide alert messages at the correct notification area are available.

However, the growing use of public hot spots and their use for access to a 3GPP network results in the demand to provide PWS over N3GPP access, especially over WLAN.

OTT applications provide a warning mechanism usable via public hotspots and WLAN, but the usage is voluntary, not regulatable and requires a user to install and maintain an application on his/her device. Also, the mechanisms only work on smart devices that can run such applications while other types of UE device like simple phones, machines and sensors are out of scope for such features.

As a result, there is missing a PWS usable over N3GPP access but controlled by an operator network and usable by a broad variety of mobile devices.

US 2017/0289883 A1 describes a technique for handing over an established emergency services session from a cellular 3GPP wireless access network to a non-3GPP wireless access network. The document is silent regarding the transmission of PWS messages which would not require the establishment of an emergency services session and indeed, the establishment of an emergency services session in order to transmit such PWS messages would be counterproductive.

General Description

Throughout this invention the terms core network functions and core network entities will be used basically as a synonym. The term core network function reflects the new language of the 5G standard, referencing functions that can be executed by a variety of actual entities of the network. Core network functions can for example be executed by server providing a virtual machine virtualizing network entities for authentication and registration, for subscriber data base access or broadcast delivery management. The term core network entity is used in former standards where the main functions like the ones mentioned above could be clearly associated to an entity, e.g. the Mobility Management Entity. Throughout this invention, the terms are used exchangeable as they refer to functions provided by any physical entity of the core network.

The present invention provides a method of enabling a provision of public warning system, PWS, messages to a user equipment, UE, device via a non-3GPP radio network, the method comprising establishing an internet protocol security, IPSec, tunnel connection from the UE device to a non-3GPP interworking function, N3IWF, via a non-3GPP, N3GPP, radio access technology, requesting from a first core network, CN, entity a provision of public warning system, PWS, messages; and providing the first CN entity with information about a location of the UE device.

A UE device may access a CN of a first PLMN via N3GPP access and a N3IWF, the UE device, having setup an IPSec tunnel to the N3IWF, requests from a CN entity delivery via the N3GPP access of alert messages (such as warning messages or notifications about pending warning messages) provided by a warning notification provider, and the UE device informs the CN entity about its location in the form of informing about a cell ID and/or TA of a cell from which the UE device received signals via a 3GPP access, or informing about a geo-position of the UE device, or subscribing with the CN entity to a group to which alert messages are provided by the CN entity based on a notification area relating to the group, or subscribing with the CN entity to a group to which alert messages are provided by the CN entity and the CN entity determining the UE device location from information received while the UE connects to the CN entity (e.g. IP-address).

The CN entity may be the N3IWF, the N3IWF using mechanisms of source specific IP multicast (SSM) to deliver alert messages, with the N3IWF transmitting alert messages via the IPSec tunnel to the UE device, the alert messages addressed to a multicast address specific for alert messages and the alert messages having a source address relating to an area comprising the notification area of the alert message, and the UE in that case subscribing with the N3IWF to a multicast (MC) channel (channel=MC source and destination address) specific for alert messages for an area comprising the location of the UE device.

Alternatively, the N3IWF may use mechanisms of any source IP multicast (ASM) to deliver alert messages, the N3IWF transmitting alert messages via the IPSec tunnel to the UE device, the alert messages addressed to a multicast address specific for alert messages for an area comprising the notification area of the alert message, and the UE in that case subscribing with the N3IWF to a multicast group (group=MC destination address) specific for alert messages for an area comprising the location of the UE device.

The N3IWF may subscribe at another CN entity (NEF) to a service (of that entity) for delivery of alert messages relevant for the position of that UE if it is not yet subscribed. In other words: The N3IWF may subscribe at another CN entity to a service (of that entity) for delivery of alert messages relevant for the position of at least one UEs served by the N3IWF.

The CN entity may be an AMF, the AMF subscribing the UE device at the N3IWF to a multicast (MC) channel or a multicast group specific for alert messages for an area comprising the location of the UE device, and the AMF also subscribing the N3IWF at a CN entity (NEF) to the same MC channel or group if it is not already subscribed, or the AMF subscribing the N3IWF at a CN entity (NEF) to a service for delivery of alert messages corresponding to the MC channel or group (if it is not already subscribed), and the AMF optionally storing the association between N3IWF and/or the UE device and the PWS service and relevant notification area or location of the UE device (note: the storage is not preferred but an option, see embodiments).

The AMF may inform the UE device about one or more MC groups or MC channels the UE device should receive (or should listen to) from the N3IWF in order to receive the requested alert messages, and a CN entity (NEF) may deliver alert messages relevant for a specific location to the N3IWF if at least one UE device indicated interest in the PWS service of the specific location. A single alert message (potentially in a few repetitions) is transmitted to the N3IWF for all UE devices connected via the N3IWF (i.e. in a multicast manner), and the N3IWF delivers alert messages to UE devices subscribed to the group or channel that corresponds to the respective (notification area of the) alert message, the messages transmitted by the N3IWF to the UE device addressed to the group and delivered point to point through the secure tunnel established between UE and the N3IWF.

The CN entity may be a new entity dedicated to PWS or existing CN functions are extended to include PWS functionality, although implementations of new PWS functions in N3IWF or AMF are beneficial it is not excluded to implement new PWS functions in either a new CN entity or extend an existing entity other than N3IWF or AMF.

Messages corresponding to the messages in sections above have to be exchanged between the PWS entity and N3IWF or AMF in any combination.

The CN entity (N3IWF or AMF) preferably informs the UE device during registration over a N3GPP access whether PWS is supported over the N3GPP access and whether PWS for an area is supported that comprises the location of the UE device. The UE device receives broadcast information in a 3GPP access network to receive PWS alert message in case PWS is not supported over the N3GPP access or PWS is not supported over N3GPP access for any area comprising the UE device location.

A UE may access a CN via N3GPP access and N3IWF, the UE informing the N3IWF about interest/capability to receive PWS alert message via IGMP, i.e. subscription to MC group or MC channel relevant for warning alerts at the location of the UE device, or the location is explicitly provided by the UE device to the N3IWF indicating a geo position, or an IP-address (with which the UE device is visible from N3IWF), or the UE device informs the N3IWF about a PLMN ID, the mobile country code thereof, and/or a TA and/or a cell ID received via a 3GPP access network, e.g. by providing the information explicitly or by subscribing to a group that is specific for an area comprising the country, the PLMN, the TA and/or the cell ID.

Alternatively, the UE may inform an AMF (e.g. during registration) about interest/capability to receive PWS alert message, the UE informing the AMF about its locations in form of a geo position or PLMN, country, TA or cell ID, the position, PLMN, TA or cell ID may point to a location outside the general coverage area of the PLMN of the AMF, the AMF subscribing the UE at the N3IWF to one or more MC groups or channels relevant for warning alerts at the location of the UE device.

The location of the UE device may be in the general coverage area of the second PLMN, i.e. the PLMN territory, but out of 3GPP access coverage and connected to the first PLMN via N3GPP access, e.g. in a cellar or bigger house or in a white spot of the second PLMN. An alert message received by the UE device comprising information about the notification area of the alert and the UE determining based on that information and its own location whether the alert message is to be processed or not, e.g. whether the user of the UE device is to be alerted.

The UE may receive from the N3IWF or an AMF information whether PWS is supported via N3IWF in the CN or whether PWS is supported via N3IWF for an area comprising the location of the UE device and listen to broadcast of alert messages in a 3GPP access network if PWS is not supported in the CN.

The UE device if PWS is not supported in the CN may de-register from the AMF in order to attach to a PLMN different from the PLMN of the AMF. A first PLMN (e.g. home) receiving from a UE device via a N3IWF a request for delivery of alert messages relevant for a notification area comprising the location the UE device, the location of the UE device being in the general coverage area of a second PLMN (e.g. visited) that does not geographically overlap with the first PLMN, and the first PLMN transmitting to the second PLMN a request for delivery of respective alert messages, the request comprising location information relating the notification area of the requested alert messages, and the first PLMN receiving an acknowledgement of the request informing about the second PLMN forwarding the requesting alert message to the first PLMN, and the first PLMN acknowledging to the UE device the delivery of the requested alert messages (if such alert message are received).

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

The general 5G core network architecture serving 3GPP access and N3GPP access for a UE has been described above.

Figure 2:
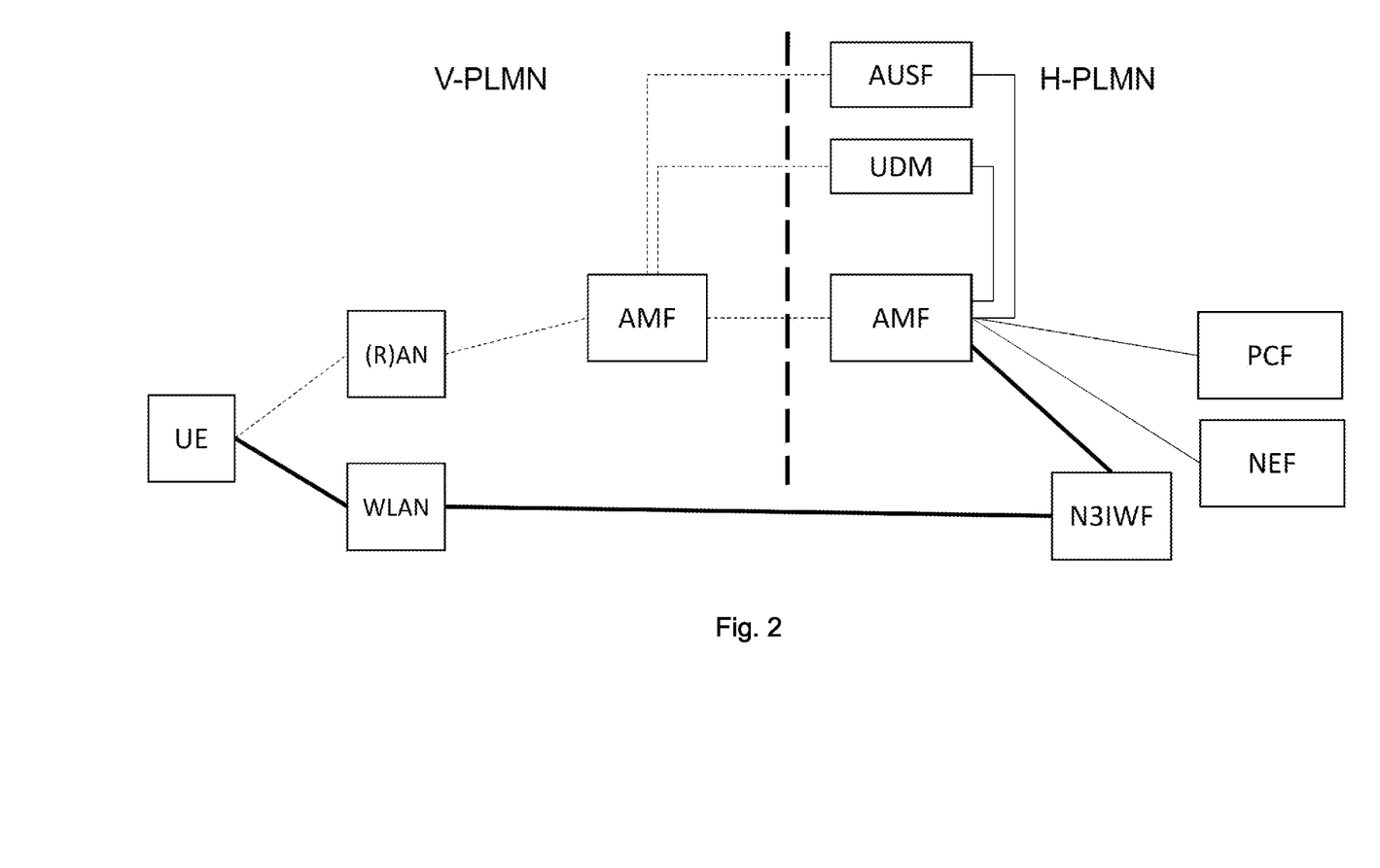
FIG. 2 is a simplified CN architecture in a roaming scenario.

FIG. 2 shows in addition a simplified CN architecture in the roaming case, i.e. in the case where a subscriber accesses a CN that is not his home PLMN. The UE registers at the AMF in the visited network similar to what is described above, but the AMF contacts the home network for authentication. The UDM and AUSF in the home network authenticate the UE and create a security context which is transferred to the AMF in the visited network.

According to the new CN architecture of 5G, the UE may simultaneously to accessing a visited PLMN via 3GPP access, access the home PLMN via N3GPP, e.g. via WLAN over the internet. The N3GPP access is then provided via an N3IWF of the home PLMN and a second registration at an AMF in the home PLMN takes place.

The first embodiment is based on a general architecture according to FIG. 2, i.e. a UE is assumed to reside in a location where it cannot reach its home PLMN via 3GPP access. The UE may be in the general coverage are of a visited PLMN, but the UE is not registered to the visited PLMN. FIG. 2 shows the connection to the RAN and the visited PLMN in dashed lines because while a registration at the visited PLMN is assumed to be not available, the UE may in some embodiments receive information from the visited network.

Figure 3:
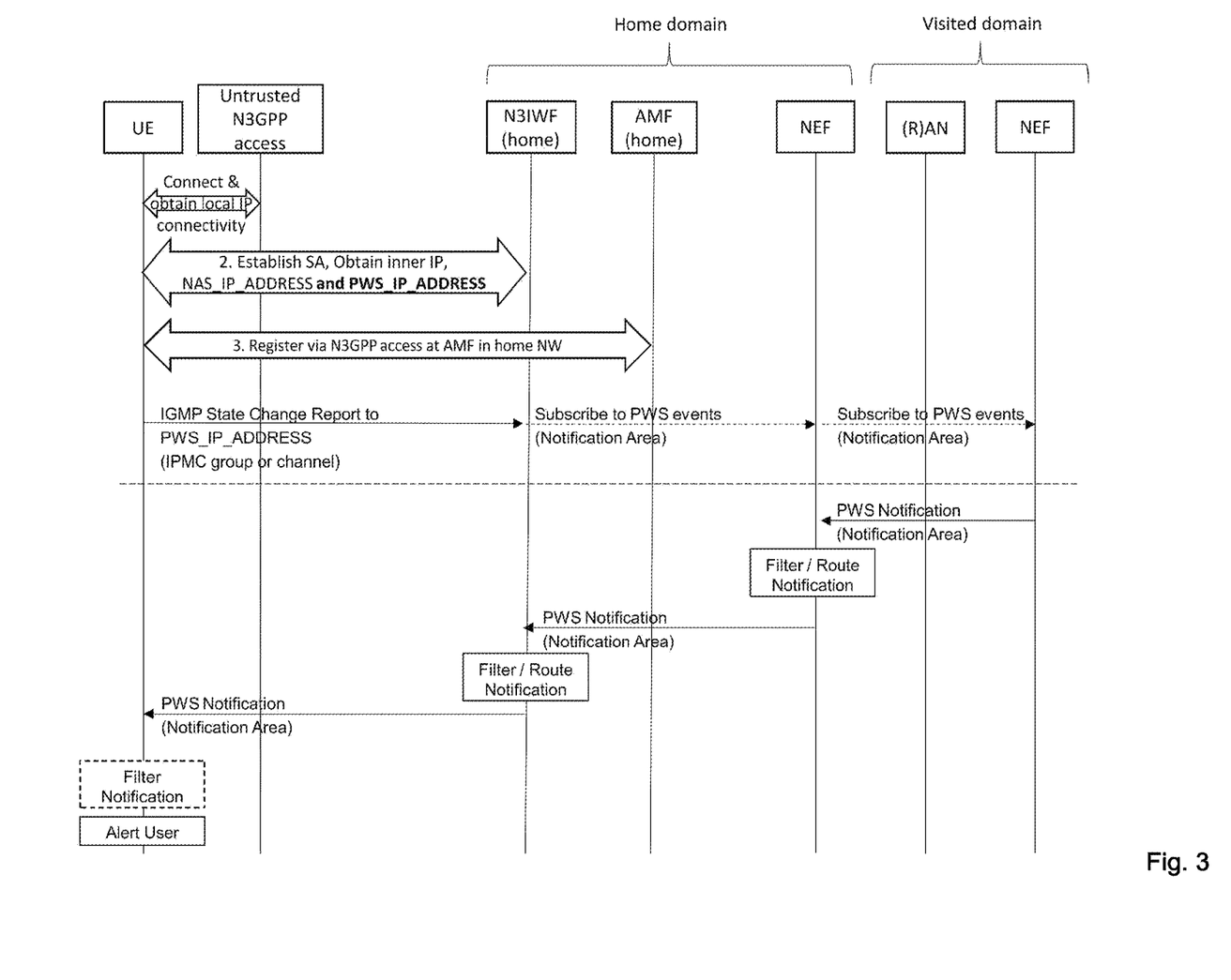
FIG. 3 is a message sequence chart for the establishment of PWS messaging.

A first embodiment is shown as a message sequence chart in FIG. 3. The UE first connects, e.g. via a WLAN, to an untrusted N3GPP access network and obtains a local IP address. The WLAN provides access to a wide area network, e.g. the internet, and the UE connects to a N3IWF of its home PLMN. It establishes a Security Association with the N3IWF so that an IPSec tunnel is further on used to exchange data securely between UE and the N3IWF. The UE receives from the N3IWF an inner IP address and the IP address to be used for addressing CN signaling messages, i.e. messages to and from the AMF. The UE registers at a selected AMF in the home PLMN which may include authentication via an AUSF and/or the UDM in the Home PLMN.

According to one aspect of the current invention, the UE also receives from the N3IWF an IP address for addressing messages with regard to PWS, the PWS_IP_ADDRESS. The UE stores that address and during or after registration with the PLMN, the UE subscribes to PWS events at the N3IWF. The messages for subscription may be addressed to the PWS_IP_ADDRESS so that they can be clearly distinguished from NAS messages or user data in the N3IWK. The subscription may be performed using the internet group management protocol (IGMP) as described in IETF RFC 3376. Alternatively, any other message framework and format may be used to inform the N3IWF that the UE requests delivery of PWS alert messages via an IPSec tunnel associated with the UE.

In case IGMP is used, the subscription message may have the format of an IGMP state change report. The message contains filter information about which alert messages are relevant for the UE device, i.e. an alert level or alert priority and information relating to the Notification Area relevant for the UE. As filter information the multicast group to which the UE subscribes may be used so that there is one multicast group, i.e. one multicast destination IP address, for each notification area that the UE can subscribe to. Alternatively, the source specific multicast is used and there is one multicast channel for each notification area, i.e. one IP multicast source and destination IP address pair.

It should be noted that the filter information provided to the N3IWF may not totally resolve the notification area of interest for the UE. It may be foreseen that the UE subscribes to alert messages relevant for a large area, e.g. the country in which the UE resides, and alert messages that are received by the UE are further filtered for local relevance after reception.

One example for filter information based on multicast groups is one group per country of relevance, another example would be one group per state for alert areas within the home PLMN (assuming a federal state) and one group per country for countries outside the home PLMN.

One example for filter information based on multicast channels is one multicast destination address per country and one multicast source address per region within the country. Another example is one multicast destination address for the PWS service as a whole and one multicast source address per country.

In this embodiment it is assumed the UE has the mapping between locations or alert areas and filter information stored. The information may be received before the describes procedure started, e.g. through the home PLMN while 3GPP connected, or it may be stored on the SIM card or obtained through the internet.

According to another aspect of this invention, the N3IWF subscribes at an entity of its PLMN to alert messages the UE subscribed to if it is not already subscribed, e.g. due to another UE's request for such messages in the past. The entity to which the N3IWF subscribes can be any entity of the CN, e.g. an AMF or the UDM. But according to the current network architecture, the network exposure function (NEF) has the general functionality to expose information like capabilities and events to other network functions. The NEF can also communicate with authenticated entities outside the PLMN to provide information received within the CN or to receive information from outside entities and provide the information within the CN.

According to another aspect of this invention, the NEF of the home PLMN subscribes at the NEF of a visited PLMN for alert messages relevant for the general coverage area of the visited PLMN. This functionality of a first PLMN subscribing at a second PLMN to alert messages relating to the second PLMN's 3GPP access network coverage area is yet unknown. It is of cause only executed if the first PLMN is not already subscribed to the alert messages. This optionality is indicated in FIG. 3 by dashed lines.

This aspect can similarly be achieved by the NEF of the first PLMN subscribing directly at an entity of a warning notification provider, e.g. operated by the authorities of the respective country. The mechanism is the same as the subscription at the second PLMN, only the entity will not be a CN entity like the NEF.

The subscription to alert messages between N3IWF and NEF and between two NEFs of different PLMNs can use the same or different protocols as the UE subscribing at the N3IWF.

Now, at any time later (indicated in FIG. 3 by a dashed horizontal line), an alert message may be provided by a notification authority to the second PLMN. The NEF of the second PLMN notifies the first PLMN about alerts the first PLMN is subscribed to. It provides the notification messages together with location information comprising the notification area which may be provided in a much finer granularity than defined by the subscription options. For example, if the subscription was related to alert message of California, USA, the notification area in an alert message may relate to Union Square, San Francisco, USA.

The NEF in the first PLMN may thus filter the messages for relevance and it forwards the messages to all N3IWFs which subscribed to the messages. The N3IWK may filter the messages again based on location and relevance information and forward the message as IP multicast message to subscribed UEs, i.e. addressed to the destination address of the subscribed to multicast group and sourced from either the source address subscribed to or the PWS_IP_ADDRESS. The multicast alert messages are, despite the fact they have been transmitted to the N3IWF as multicast and they are addressed as multicast, transmitted between N3IWF and the UE (and potentially other UEs receiving the same messages) individually through the IPSec tunnel to the UE.

The UE may then finally filter the messages based on the Notification Area provided with the message and a known location of the UE. If the message passes the filter, i.e. the message is relevant for the UE or the user, an alert is initiated. In case the UE is a user device with an MMI, an alert is provided to warn the user. In other cases, the alert may result in appropriate action taken by a machine device.

Figure 4:
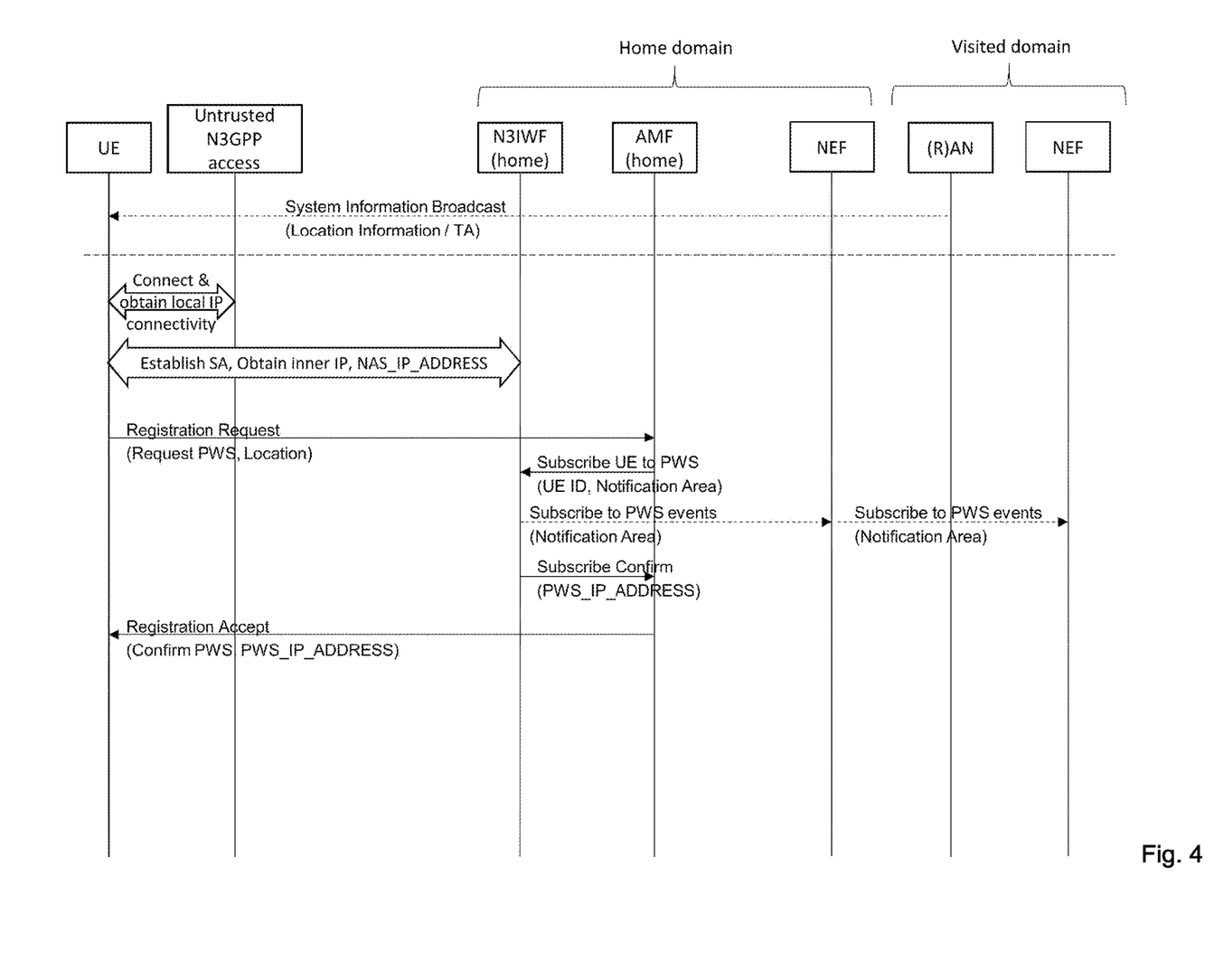
FIG. 4 is a further message sequence chart of a second embodiment.

A second embodiment is shown in FIG. 4. It may start with an optional step shown in the figure as dashed line and separated with dashed horizontal line to emphasize that the optional step may occur at any time before the procedure starts. The optional step assumes a UE in the coverage area of a first PLMN to which it may or may not be registered and which may be a visited or home PLMN. The UE receives in the first PLMN broadcast information that bear location information, e.g. in the form of a tracking area or a cell ID of a cell that broadcasts the information. Alternatively, the cell broadcasts a PWS notification area identification which is relevant for the cell. The location information is stored by the UE.

Now, the UE connects to a local N3GPP network and from there to a N3IWF of a second PLMN. The second PLMN may be identical to the first PLMN or it may be a different PLMN. FIG. 4 distinguishes the two PLMN as "visited domain" for the first PLMN and "home domain" for the second PLMN just to ease readability and to provide a typical embodiment. Nothing in this invention should restrict the two PLMN to exchange role with regard to "home" and "visited" or to be identical, both "home" or both "visited".

For registration of the UE at an AMF, which may be during or after establishment of a Security Association with the N3IWF, the UE transmits a registration request message to the AMF. According to this invention, the registration request may comprise information indicating that the UE needs to receive PWS alert messages from the PLMN via the N3GPP access. The reason may be that the UE lost connection to the first PLMN, e.g. because it changed location, or the link properties changed, or because of a preference for registration to the second PLMN, e.g. its home PLMN. In addition to the information requesting PWS alert message delivery, the UE provides location information so that the AMF or any other CN entity in the second PLMN can determine which messages are relevant for the UE. In addition, the UE may provide a relevance or priority level for filtering alert message to the AMF for further determination.

The location information may be in the form of a tracking area (TA) or cell identity previously received over a 3GPP access network as described as an optional step in this embodiment. The location information may alternatively be a geo-position of the UE determined by the UE through built-in means like a GPS receiver or determined by an RF fingerprint (WLAN beacons and cellular network signals) or any combination thereof.

Now, according to an aspect of this invention, the AMF in the second PLMN may subscribe the UE to the respective alert message delivery service at the N3IWF. As a reference, the AMF uses a UE identification and the AMF provides the notification area or areas to which the UE needs to be subscribed.

Now, if the N3IWF is not already subscribed to the respective message delivery at the respective notification provider of the PLMN, e.g. the NEF as in the first embodiment, it will subscribe to that service as a result of the subscription of the UE to the alert message delivery. The NEF of the second PLMN may then subscribe to the service of the first PLMN that is selected based on the subscribed to notification area by the N3IWF.

Alternatively, the N3IWF in the second PLMN may be subscribed to the respective service of the NEF by the AMF. That is, the AMF may be the entity that subscribes the UE at the N3IWF and the N3IWF at the NEF to the service. This alternative may need the AMF or any other CN entity of the second PLMN to store the subscriptions of the N3IWF to alert message delivery services, e.g. to prevent redundant subscriptions. Alternatively, the system ensures redundant subscriptions of the N3IWF to the same service do not cause any problems.

Before, during or after (the latter shown in FIG. 4) the subscription of the N3IWF at the NEF, the N3IWF confirms the subscription of the UE to the AMF and provides address information to the AMF which is to be used by the UE to receive PWS alert messages from the N3IWF. As described in the first embodiment, this address information may be a PWS_IP_ADDRESS used to address multicast messages form the N3IWF. The address information may also be a pair of IP addresses that constitute a multicast channel. The address information may also be different from an IP address if other mechanisms for message delivery than IP multicast are used.

The AMF finally provide the address information back to the UE, e.g. in a Registration Accept message, and it confirms the subscription to the PWS alert service. The UE used the address information to receive, i.e. listen to alert messages from the N3IWF.

The PWS alert message delivery may be the same as in the first embodiment, it is therefore omitted here.

Figure 5:
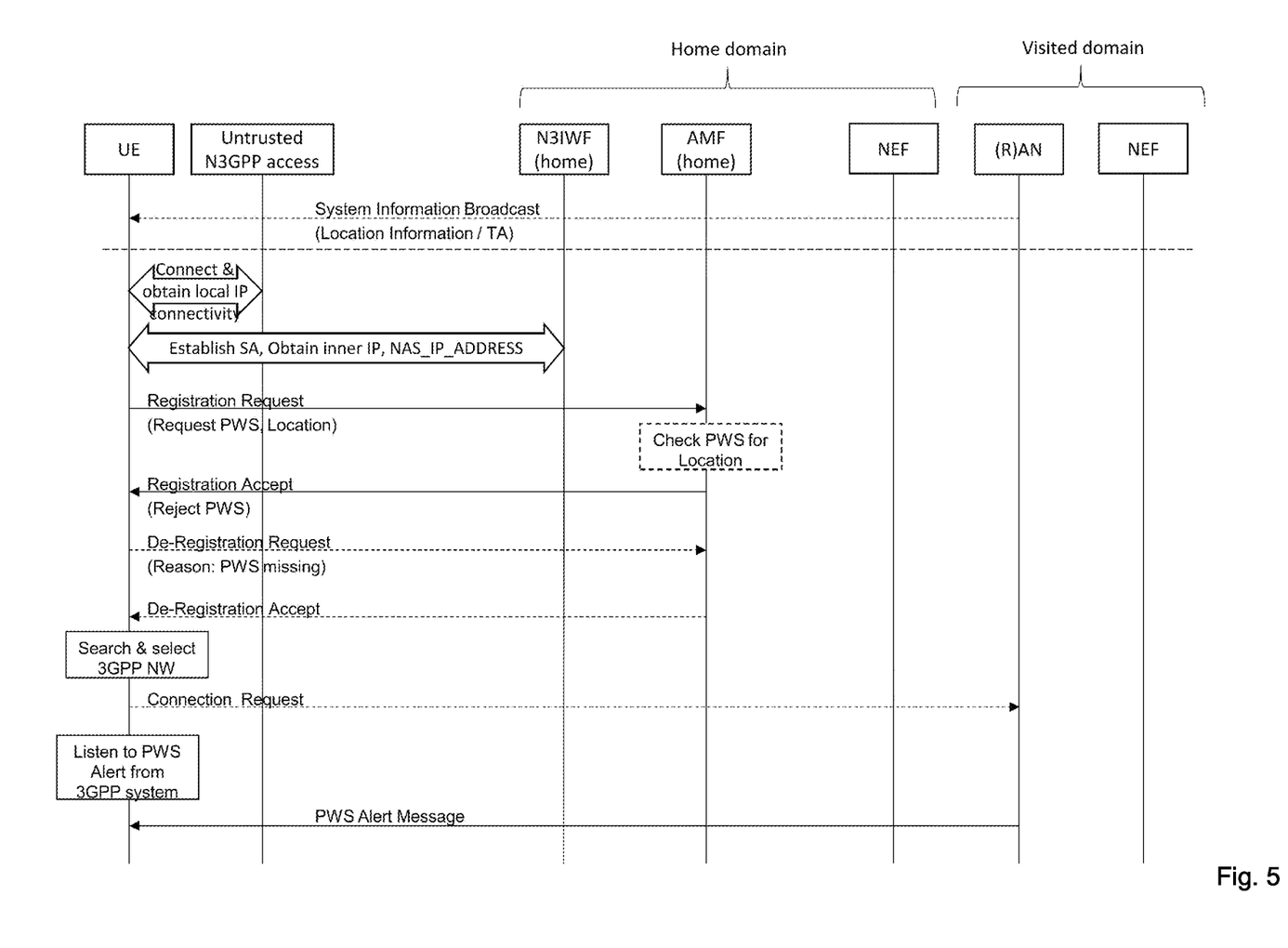
FIG. 5 is a still further message sequence chart of a third embodiment.

A third embodiment is depicted in FIG. 5. It starts very similar to the second embodiment; a UE may have received location information earlier and the UE now connects to a local N3GPP access network and to a N3IWF of its home PLMN. It sends a registration request message including an indication that PWS alert messages need to be delivered to the UE via the N3IWF and N3GPP access. The indication comprises location information to identify messages relevant for the UE.

In contrast to the second embodiment, in the third embodiment it is assumed that the home PLMN does not support delivery of PWS alert messages to the UE. The reason may be that alert messages are not available to the home PLMN for the location provided. For that case the AMF may check for availability of alert messages after receiving the registration request message. Another reason may be that alert message delivery over N3GPP access is not supported by the home PLMN at all.

Regardless of the reason, the AMF may accept the registration of the UE but will indicate the rejection of the request to deliver PWS alert messages. According to this invention, as a result of the rejection, the UE will start to search for an appropriate 3GPP network, select a cell of that network and start listening to alert messages provided by the network over 3GPP access. Optionally, the AMF during or after registration via N3GPP access may provide the UE with information supporting the UE in receiving PWS alert messages via 3GPP, e.g. scheduling information.

Optionally, the UE may de-register from the home PLMN, providing the rejection of the PWS service as a reason, and request, after network search and cell selection, a connection to the selected cell probably with a following registration request (not shown in FIG. 5).

The invention claimed is:

1. A method of enabling a provision of public warning system (PWS) alert messages to a user equipment (UE) device via a non-3GPP (N3GPP) radio network, the method comprising:
    establishing an internet protocol security (IPSec) tunnel connection to the UE device from a non-3GPP interworking function (N3IWF) via a non-3GPP (N3GPP) radio access technology;
    receiving by a first core network (CN) entity from the UE device a request for provisioning of the public warning system (PWS) alert messages;
    receiving from the UE device by the first CN entity information about a location of the UE device;
    subscribing the UE device at the first CN entity to a group to which the PWS alert messages are provided by the first CN entity based on a notification area relating to the group, the notification area comprising the location of the UE device, and
    transmitting to the UE device the PWS alert messages having a source or a target address relating to an area comprising the notification area as a result of the subscribing of the UE device, via the IPSec tunnel.

2. The method according to claim 1, wherein the information about the location of the UE device is received in at least one of:
    a cell identification of a cell from the UE device received via a 3GPP access;
    a tracking area identification of the UE device received via the 3GPP access;
    a geographical position of the UE device obtained using signals transmitted by satellite; and an internet protocol (IP) address.

3. The method according to claim 1 wherein the N3IWF is provided by the first CN entity and wherein the PWS alert messages are transmitted using a multicasting routing protocol selected from Source Specific Multicast (SSM) and Any Source Multicast (ASM).

4. The method according to claim 1, wherein a network exposure function (NEF) of a home public land mobile network (PLMN) subscribes at an NEF of a PLMN having a geographical coverage including the location of the UE device.

5. The method according to claim 1, wherein the first CN entity includes an authentication and mobility function (AMF) and wherein the AMF subscribes the UE device to one of a multicast channel and a multicast group specific for the PWS alert messages for an area including the location of the UE device.

6. The method according to claim 5, wherein the AMF subscribes the N3IWF to a second CN entity for delivery of the PWS alert messages to the UE device.

7. The method according to claim 1, wherein the first CN entity informs the UE device over the N3GPP radio access technology whether the PWS alert messaging is supported over the N3GPP radio access technology.

8. A mobile communication network adapted to transmit public warning system (PWS) alert messages, to a user equipment (UE) device over an internet protocol security (IPSec) tunnel connection from a non-3GPP interworking function (N3IWF) of the mobile communication network to the UE device via a non-3GPP (N3GPP) radio access technology, the mobile communication network being adapted
    to receive capability information from the UE device, the capability information informing about a capability of the UE device to receive PWS alert messaging, wherein the capability information may indicate a desire of a user of the UE device to receive such messaging;
    to receive location information from the UE device, the location information informing about a location of the UE device;
    to subscribe the UE device to a group to which the PWS alert messages are provided by the mobile communication network based on a notification area relating to the group, the notification area comprising the location of the UE device, and
    to transmit to the UE device the PWS alert messages having a source or a target address relating to an area comprising the notification area via the IPSec tunnel, as a result of the subscribing of the UE device.

9. The mobile communication network according to claim 8, wherein the mobile communication network includes an authentication and mobility function (AMF) and wherein the AMF subscribes the UE device to the group to which the PWS alert messages are provided by the mobile communication network.

10. The mobile communication network according to claim 8, wherein the mobile communication network is arranged to transmit to the UE device confirmation information confirming registration of the UE device to a PWS alert message delivery service.

* * * * *

UNITED STATES PATENT AND TRADEMARK OFFICE
CERTIFICATE OF CORRECTION

| | | |
|---|---|---|
| PATENT NO. | : 11,778,447 B2 | Page 1 of 1 |
| APPLICATION NO. | : 17/538181 | |
| DATED | : October 3, 2023 | |
| INVENTOR(S) | : Andreas Schmidt et al. | |

It is certified that error appears in the above-identified patent and that said Letters Patent is hereby corrected as shown below:

In the Claims

At Column 12, Line 53, "device, and" should be -- device; and --.

At Column 12, Lines 66-67, "an internet protocol (IP) address." should be at Line 67, as a new sub-point.

Signed and Sealed this
Twenty-fourth Day of December, 2024

Derrick Brent
*Acting Director of the United States Patent and Trademark Office*